(12) United States Patent
Yu (10) Patent No.: US 10,197,089 B2
(45) Date of Patent: Feb. 5, 2019

(54) CLIP AND CLIP ATTACHING STRUCTURE

(71) Applicant: NIFCO AMERICA CORP., Canal Winchester, OH (US)

(72) Inventor: Yong Quan Yu, Canal Winchester, OH (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 159 days.

(21) Appl. No.: 15/254,550

(22) Filed: Sep. 1, 2016

(65) Prior Publication Data
US 2018/0058493 A1    Mar. 1, 2018

(51) Int. Cl.
  *F16B 37/04*   (2006.01)
  *F16B 23/00*   (2006.01)
  *F16B 2/22*    (2006.01)

(52) U.S. Cl.
  CPC ............... *F16B 37/043* (2013.01); *F16B 2/22* (2013.01); *F16B 23/0061* (2013.01)

(58) Field of Classification Search
  CPC ....... F16B 2/22; F16B 37/043; F16B 23/0061
  See application file for complete search history.

(56) References Cited

U.S. PATENT DOCUMENTS

| 4,850,773 | A | * | 7/1989 | Asami | F16B 9/023 |
| | | | | | 24/297 |
| 4,883,382 | A | * | 11/1989 | Mushya | F16B 5/0233 |
| | | | | | 174/138 D |
| 4,890,966 | A | * | 1/1990 | Umezawa | F16B 13/0808 |
| | | | | | 24/289 |
| 8,979,456 | B2 | * | 3/2015 | Soriano | B60R 13/0206 |
| | | | | | 16/2.1 |
| 2012/0155985 | A1 | * | 6/2012 | Ruckel | F16B 37/043 |
| | | | | | 411/301 |
| 2013/0028681 | A1 | * | 1/2013 | Limpert | F16B 37/043 |
| | | | | | 411/108 |
| 2013/0039718 | A1 | * | 2/2013 | Fellows | F16B 37/043 |
| | | | | | 411/112 |
| 2016/0288733 | A1 | * | 10/2016 | Akazawa | F16B 5/0657 |
| 2017/0284437 | A1 | * | 10/2017 | Landsberg | F16B 5/0642 |
| 2017/0291558 | A1 | * | 10/2017 | Meyers | B60R 13/0243 |
| 2018/0056893 | A1 | * | 3/2018 | Bumgarner | B60R 13/0212 |

FOREIGN PATENT DOCUMENTS

| JP | 2007-285319 A | 11/2007 |
| JP | 2011-089543 A | 5/2011 |

* cited by examiner

*Primary Examiner* — Jason W San
(74) *Attorney, Agent, or Firm* — Manabu Kanesaka (57) ABSTRACT

A clip for attaching an attaching member to an attached member through a male connector of the attached member, includes a main body portion; a locking portion for engaging the male connector; a claw portion having elasticity to deform when inserted into a hole of the attaching member, and to return to an original form after passing through the hole; a first flange portion extending radially outwardly from an outer circumferential surface of the main body portion; a second flange portion extending radially outwardly from the outer circumferential surface of the main body portion between the first flange portion and the claw portion, for sandwiching the attaching member between the first and second flange portions; and a tool hooking portion on the another side of the main body portion, for receiving a tool to rotate in respect to the male connector.

7 Claims, 9 Drawing Sheets

CLIP AND CLIP ATTACHING STRUCTURE

FIELD OF THE INVENTION

The present invention relates to a clip for attaching an attaching member to an attached member through a male connector of the attached member, and a clip attaching structure including the aforementioned clip and the attaching member. More specifically, the present invention relates to a press nut installed on a cover body to attach the cover body to a transmission control module. The transmission control module includes screws protruding from a side of the transmission control module, and the press nuts engage the screws to attach the cover body to the transmission control module.

BACKGROUND OF THE INVENTION

Figure 8A:
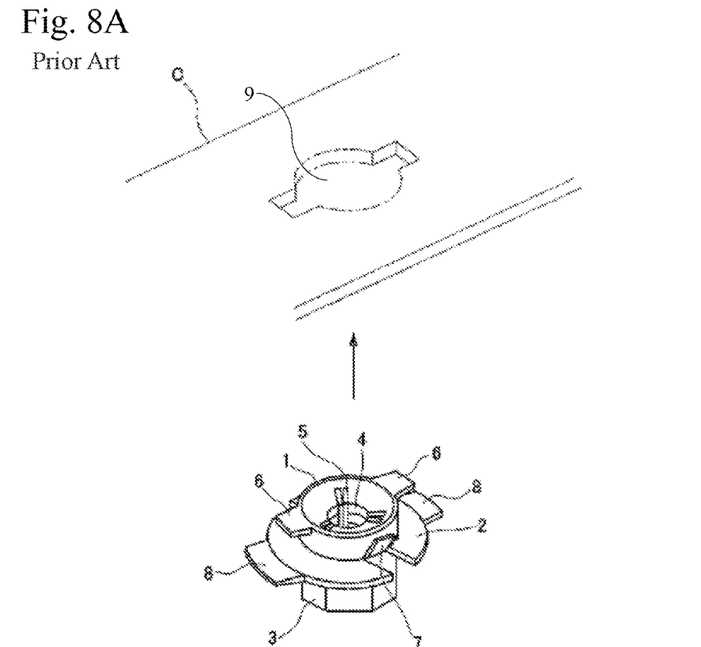
FIG. 8A is a perspective view thereof to be installed on a cover body with an installing hole.

For an example of a conventional clip and installing structure of clip and cover body, PTL 1 is referred to. In FIG. 8A of the present application, a perspective view of the conventional clip of PTL 1 to be installed on the cover body C with an installing hole 9 is shown. The conventional clip of PTL 1 includes a main body portion 1 having a cylindrical shape; a pair of stopper pieces 6 formed with holding members 4, 5 and extending from one side of the main body portion 1; a large diameter contact plate part 2 extending radially outwardly from the main body portion 1 and having a pair of rotating prevention pieces 7 and a pair of pressing pieces 8 extending radially outwardly from the contact plate part 2; and a tool hooking part 3 disposed at another side of the main body portion 1.

Figure 8B:
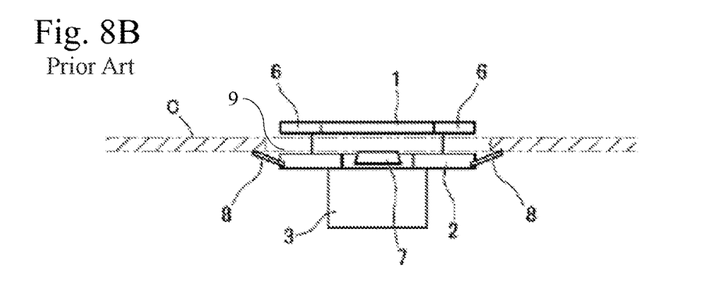
FIG. 8B illustrates the conventional clip being inserted into the installing hole.
Figure 8C:
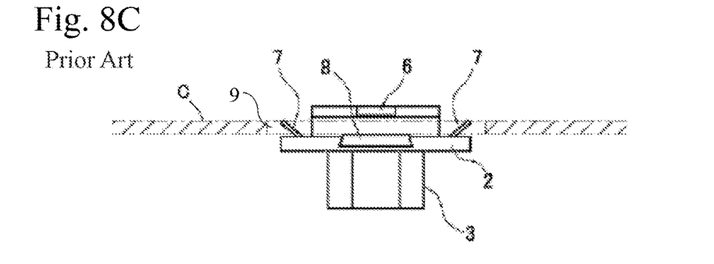
FIG. 8C illustrates the conventional clip engaging the installing hole.

As shown in FIG. 8B of the present application, when the conventional clip of PTL 1 is installed, the pair of stopper pieces 6 is inserted into the hole 9 of the cover body C having a shape corresponding to the main body portion 1 and the pair of stopper pieces 6 from below until the pair of pressing pieces 8 abuts the cover body C. Then, the conventional clip of PTL 1 is rotated until the pair of rotating preventing pieces 7 enters the portion of the hole 9 corresponding to the shape of the pair of stopper pieces 6 as show in FIG. 8C of the present application. The pair of stopper pieces 6 and the pair of pressing pieces 8 of the large diameter contact plate part 2 sandwich the cover body C, and the pair of rotating preventing pieces 7 prevents the conventional clip of PTL 1 from rotating unintentionally, i.e. a vibration of the motor vehicle, thereby the conventional clip of PTL 1 is securely installed in the cover body C. Then, the cover body C installed with the conventional clip of PTL 1 is mounted over a panel of the automobile.

The holding members 4, 5 formed on an inner circumferential surface of the main body portion 1 of the conventional clip of PTL 1 engage a screw portion protruding from the panel of the automobile; thereby, the cover body C is attached to the panel of the automobile. To uninstall the conventional clip of PTL 1, a tool such as a wrench is used on the tool hooking portion 3 to rotate the main body portion 1 and disengage the main body portion 1 from the screw portion.

Figure 9A:
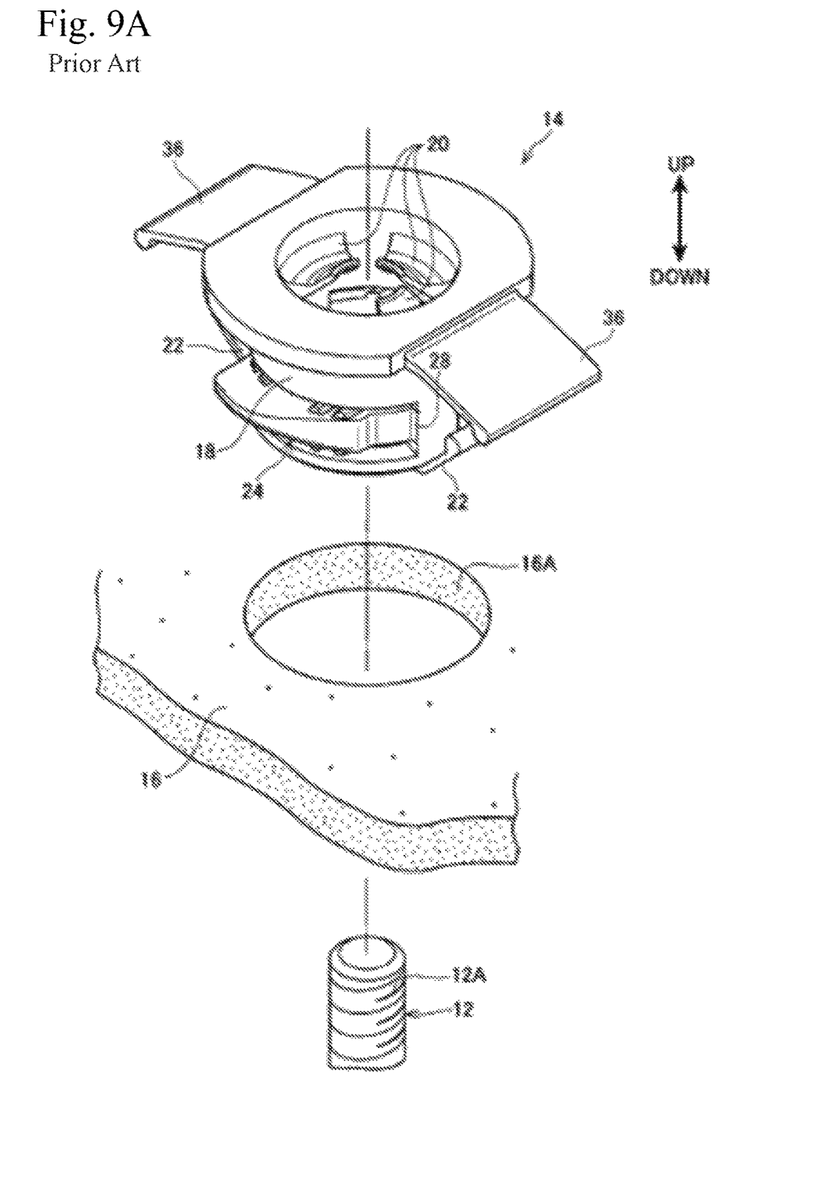
FIG. 9A illustrates a perspective view thereof to be installed on a panel with an installing hole.

For another example of a conventional clip and installing structure of clip and panel, PTL 2 is referred to. In FIG. 9A of the present application, a perspective view of the conventional clip of PTL 2 to be installed on the panel 16 with an installing hole 16A is shown. The conventional clip 14 of PTL 2 includes a hub 18 having a cylindrical shape; a pair of first sandwiching pieces 22 extending from one side of the hub 18; a pair of second sandwiching pieces 36 extending from another side of the hub 18; a pair of claw portions 24 arranged between the pair of first sandwiching pieces 22, each being connected to the hub 18 at a base portion 28 of the claw portion 24; and locking pieces 20 formed on an inner circumferential surface of the hub 18 for engaging a screw groove 12A of a stud bolt 12.

Figure 9B:
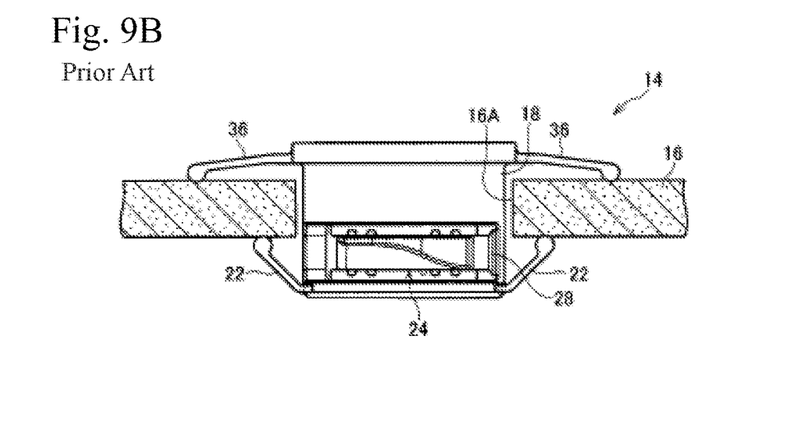
FIG. 9B illustrates the conventional clip engaging the installing hole.
Figure 9C:
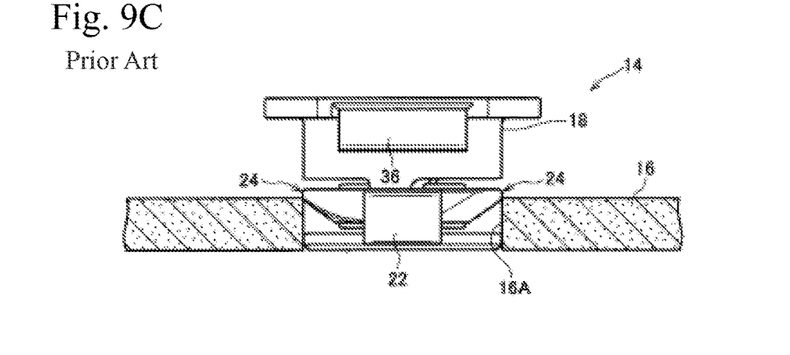
FIG. 9C illustrates the conventional clip being inserted into the installing hole.
Figure 9D:
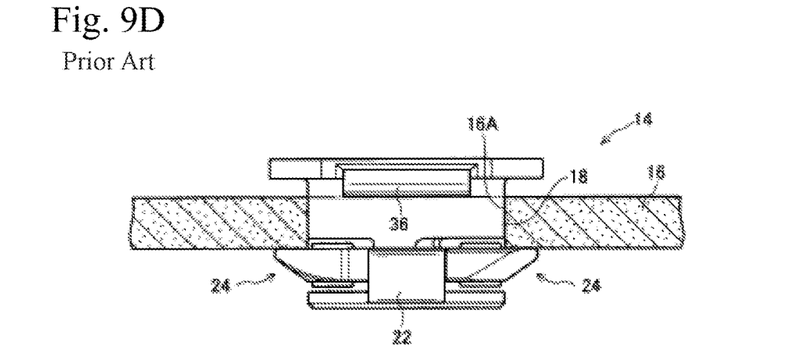
FIG. 9D illustrates the conventional clip engaging the installing hole from a view different from FIG. 9B.

The conventional clip 14 of PTL 2 is inserted into the hole 16A of a panel 16 from the one side. As shown in FIG. 9B of the present application, the pair of sandwiching pieces 22 deforms in an axial direction of the hub 18 when the clip 14 is inserted into the hole 16A and returns to the original form after passing through the hole 16A to engage a periphery edge of the hole 16A. When the clip 14 is inserted into the hole 16A, the pair of claw portions 24 abuts the periphery edge of the hole 16A so that the pair of claw portions 24 deforms radially toward an inside of the hub 18 as shown in FIG. 9C of the present application, and as shown in FIG. 9D of the present application, deforms outwardly to return to original form after passing through the hole 16A; thereby, the clip 14 sandwiches the panel 16 among the pair of first sandwiching pieces 22, the pair of claw portions 24, and the pair of second sandwiching pieces 36.

Then, when the panel 16 installed with the conventional clip of PTL 2 is mounted over another panel of the automobile, the locking pieces 20 formed on an inner circumferential surface of the hub 18 of the conventional clip 14 receives a stud bolt 12 protruding from the another panel of the automobile; thereby, the panel 16 is secured to the another panel of the automobile.

CITATION LIST

Patent Document

PTL 1: JP Publication 2007-285319 A
PTL 2: JP Publication 2011-089543 A

Problems to be Solved by the Invention

In a structure of the clip in PTL 1, since the hole of the cover body C is required to have a shape corresponding to the one side of the main body portion 1, the cover body C requires a predetermined amount of space for matching such shape of the one side of the main body portion 1. Therefore, the shape of the cover body C is limited. Further, the clip in PTL 1 requires two steps for attaching the clip to the cover body, which is to press the clip into the hole of the cover body and to rotate the clip 90° to engage the cover body C.

In a structure of the clip 14 in PTL 2, the panel 16 is sandwiched between the pair of first sandwiching pieces 36 from the upper side, and the pair of claw portions 24 and the pair of second sandwiching pieces 22 from the lower side. In case the hole is a non-standard hole, e.g. an elongated hole, a hole larger than a standard hole, etc., the overlap allowance of the claw portion 24 is small; thus, a holding force is low and the general versatility of the clip 14 is reduced.

Therefore, the present invention is made in view of the aforementioned problems that a conventional technology has, and an object of the present invention is to provide a single type of clip capable of being installed on a cover body having holes of different shapes and sizes, and a clip attaching structure including such clip and cover body.

Further objects and advantages of the present invention will be apparent from the following description of the present invention.

Means for Solving the Problems

In order to obtain the aforementioned object, in the present invention, a clip for attaching an attaching member to an attached member through a male connector of the attached member includes a main body portion having a tubular shape with one side and another side opposite to the one side; a locking portion on an inner circumferential surface of the main body portion for engaging the male connector; a claw portion on the one side of the main body portion, and having elasticity to deform when inserted into a hole of the attaching member, and to return to an original form of the claw portion to engage an edge of the hole after passing through the hole; a first flange portion extending radially outwardly from an outer circumferential surface of the main body portion; a second flange portion extending radially outwardly from the outer circumferential surface of the main body portion between the first flange portion and the claw portion, for sandwiching the attaching member between the first and second flange portions; and a tool hooking portion on the another side of the main body portion, for receiving a tool to rotate in respect to the male connector.

According to such configuration, the clip is installed on the attaching member either by the claw portion corresponding to a standard hole, or by the first and second flange portions corresponding to the non-standard hole; thereby, the versatility is higher compared to PTL 1 and 2. Therefore, there is no space restriction due to unique holes on the attaching member as disclosed in PTL 1, and one or more embodiments of the clip of the present invention may be used on attaching members having various shapes and sizes. In addition, unlike the clip in PTL 1, which requires an additional step of rotating the clip after inserting into the hole, the clip of the present invention only requires a pressing of the clip into the hole of the attaching member for engagement. Therefore, the clip of the present invention also has an advantage in high efficiency when installing the clip of the present invention into the attaching member.

In the present invention, at least one of the first or second flange portion includes an elastic portion having elasticity to deform and protruding toward another of the first or second flange portion.

According to such configuration, the elastic portion prevents the attaching member from rattling.

In the present invention, the one of the first or second flange portion further includes a concave portion therein adjacent to the elastic portion in an axial direction of the main body portion, and the elastic portion formed at the one of first or second flange portion has an arc-shape protruding toward the another of the first or second flange portion.

According to such configuration, the elastic portion has enough space to deform and urge the attaching member so that the elastic portion is ensured to prevent the attaching member from rattling.

In the present invention, the claw portion is integral to the locking portion.

According to such configuration, the clip of the present invention is made compact to allow versatility of shape of the attaching member.

In the present invention, the clip of the present invention further includes an elastic piece extending radially outwardly from a lower surface of the second flange portion toward the one side of the main body portion for sandwiching the attaching member between the claw portion and the elastic piece.

According to such configuration, the elastic piece urges the attaching member to prevent rattling of the attaching member.

The present invention may include a clip attaching structure including an attaching member having a cover body, and the clip. The clip engages the cover body either between the first and second flange portions, or between the second flange portion and the claw portion, and is adapted to attach to the male connector protruding from the attached member.

According to such configuration, the clip attaching structure of the present invention is capable of attaching to the attached member.

BRIEF DESCRIPTION OF THE DRAWINGS

FIGS. 6A-6B illustrate a cover body having holes to install the clip of the present invention, wherein

FIGS. 7A-7B illustrate the clip of the present invention installed on the cover body, wherein

FIGS. 8A-8C illustrate a conventional clip of PTL 1, wherein

FIGS. 9A-9D illustrate a conventional clip of PTL 2, wherein

DETAILED DESCRIPTION OF THE EMBODIMENTS

Hereinafter, an embodiment for carrying out the invention is explained based on FIGS. 1-7B. In an explanation, terms indicating the directions follow the directions shown by a direction key in FIG. 1. However, an arrangement of the clip according to the present embodiment is not limited to the aforementioned directions.

Figure 6A:
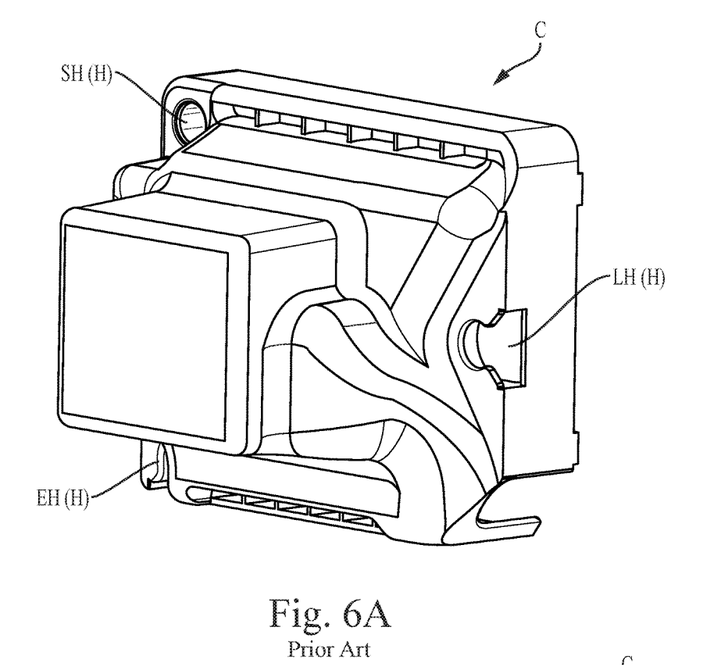
FIG. 6A illustrates a perspective view of the cover body.
Figure 6B:
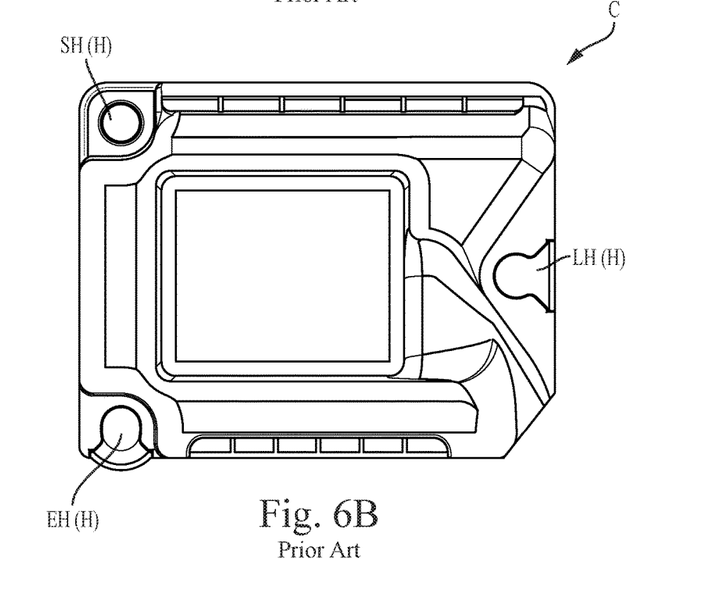
FIG. 6B illustrates a plan view thereof.

The clip 10 of the present embodiment is structured to attach a conventional cover body C shown in FIGS. 6A-6B to a conventional transmission control module of a vehicle for covering the transmission control module. The clip 10 is installed in a hole H of the cover body C and engages a screw portion of a conventional locking member, e.g. a screw, bolt, etc., protruding from the transmission control module; thereby, the cover body C is attached to the transmission control module through the clip 10.

The clip 10 according to the present embodiment includes a main body portion 1, a plurality of locking portions 2, a plurality of claw portions 3, a first flange portion 4, a second flange portion 5, and a tool hooking portion 6.

Figure 5A:
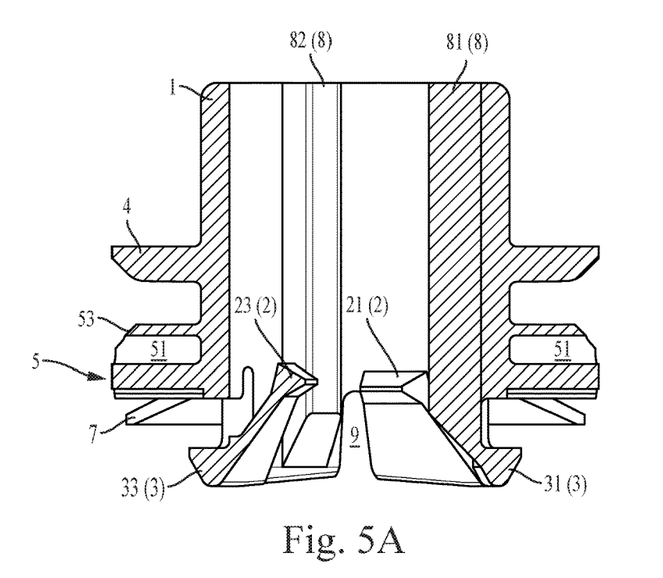
FIG. 5A is a cross-sectional view thereof taken along the line 5A-5A of FIG. 4.
Figure 5B:
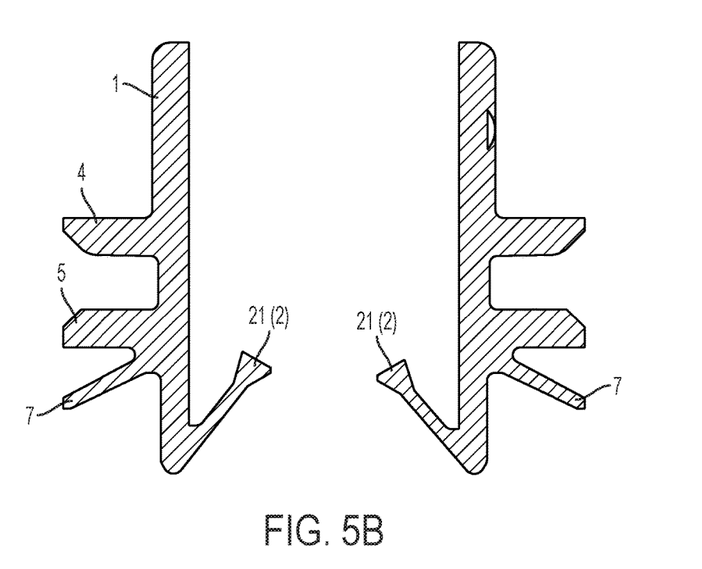
FIG. 5B is a cross-sectional view thereof taken along the line 5B-5B of FIG. 4.

The main body portion 1 is described in details in FIGS. 5A-5B.

The main body portion 1 is formed in a tubular shape as shown in FIGS. 5A-5B. An outer diameter of the main body portion 1 is less than or equal to a diameter of the hole H of the cover body C for covering the transmission control module. The main body portion 1 has an inner diameter greater than a diameter of the screw portion of the locking member protruding from the transmission control module to receive the screw portion therein, and engages the screw portion through the plurality of locking portions 2.

The plurality of locking portions 2 is described in details in FIGS. 2, 4, and 5A-5B.

As shown in FIGS. 5A-5B, the plurality of locking portions 2 is formed on an inner circumferential surface of the main body portion 1 for engaging the screw portion. Each locking portion extends upwardly and radially inwardly from the inner circumferential surface of the main body portion 1 at a lower end toward a central axis of the main body portion 1. A leading end of the locking portion 2 has a triangular shape in which a tip facing the central axis of the main body portion 1 is narrow and an upper surface is inclined downwardly toward the tip so that the upper surface guides the screw portion of the locking member toward the central axis and the tip engages the screw portion when attaching the cover body C installed with the clip 10 to the transmission control module.

Figure 4:
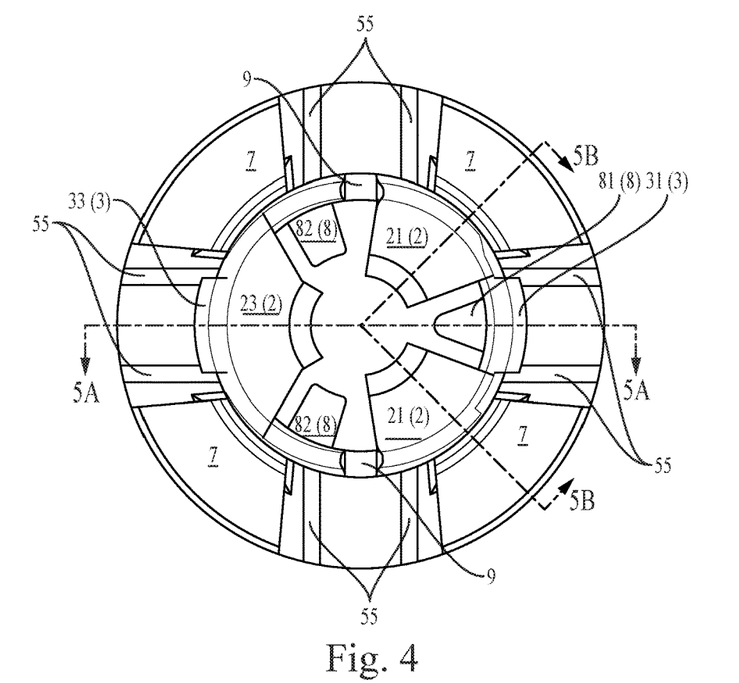
FIG. 4 is a bottom view thereof.

More specifically, in the present embodiment, three locking portions 2 are circumferentially arranged on the inner circumferential surface of the main body portion 1 with a space between adjacent locking portions, see FIG. 4. The three locking portions 2 include two front locking portions 21 and one rear locking portion 23.

The two front locking portions 21 are formed at a front side of the main body portion 1 relative to the rear locking portion 23. The rear locking portion 23 is formed at a rear side of the main body portion 1. The rear locking portion 23 is equally spaced from the two front locking portion 21, and the space between the two front locking portions 21 is less than the space between the rear locking portion 23 and each of the front locking portion 21. A width of the rear locking portion 23 in the circumferential direction is greater than that of the front locking portion 21. In addition, the rear locking portion 23 extends upwardly so that the rear locking portion 23 is positioned closer to an upper side of the main body portion 1 than the front locking portions 21.

Further, on the inner circumferential surface of the main body portion 1, ribs 8 are formed in the spaces among the three locking portions 2. The ribs 8 extend in an axial direction of the main body portion 1 to increase the rigidity of the main body portion 1. The ribs 8 include a front rib 81 formed on the front side of the inner circumferential surface of the main body portion 1 in the space between the two front locking portions 2, and rear ribs 82, each being formed in each of the spaces between the front locking portion 21 and the rear locking portion 23.

At the lower end of the main body portion 1, the plurality of claw portions 3 is formed as shown in FIG. 5A.

The plurality of claw portions 3 is described in details in FIGS. 1-5A.

The plurality of claw portions 3 extends radially outwardly from the lower end of the main body portion 1. More specifically, in the present embodiment, the main body portion 1 includes two claw portions 3, namely, the front claw portion 31 and the rear claw portion 33 as shown in FIGS. 4 and 5A.

The front claw portion 31 extends from the front rib 81 toward the front side of the main body portion 1 as shown in FIGS. 4 and 5A. The rear claw portion 33 extends from the rear locking portion 23 toward the rear side of the main body portion 1.

Each of the claw portions 3 has an inclined outer side surface gradually extending outwardly from a lower side to the upper side in the axial direction of the main body portion 1. Such side surface allows easier insertion of the clip 10 into the hole H. Further, an upper surface of the claw portion 3 is flat and formed perpendicular to the axial direction so that the upper surface of the claw portion 3 engages the edge of the hole H when installed in the cover body C.

Figure 3:
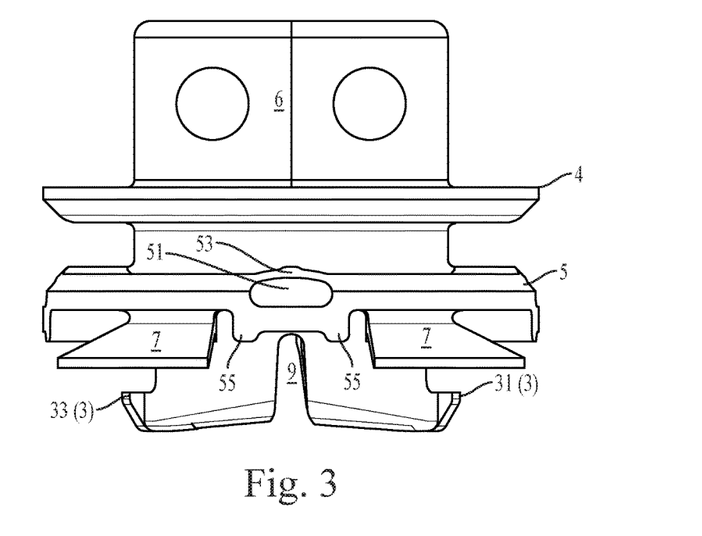
FIG. 3 is a left side view thereof.

Further, the lower end of the main body portion 1 between the front claw portion 31 and the rear claw portion 33 is formed with a pair of slits 9 as shown in FIGS. 3 and 4. Each slit 9 cuts a lower side of the main body portion 1 to define the front side and rear side of the lower end of the main body portion 1. The slits 9 allow the lower end of the main body portion 1 to deform inwardly when the clip 10 is inserted into the hole H.

Next, the first flange portion 4 is described in details in FIGS. 1-3 and 5A-5B.

Figure 7A:
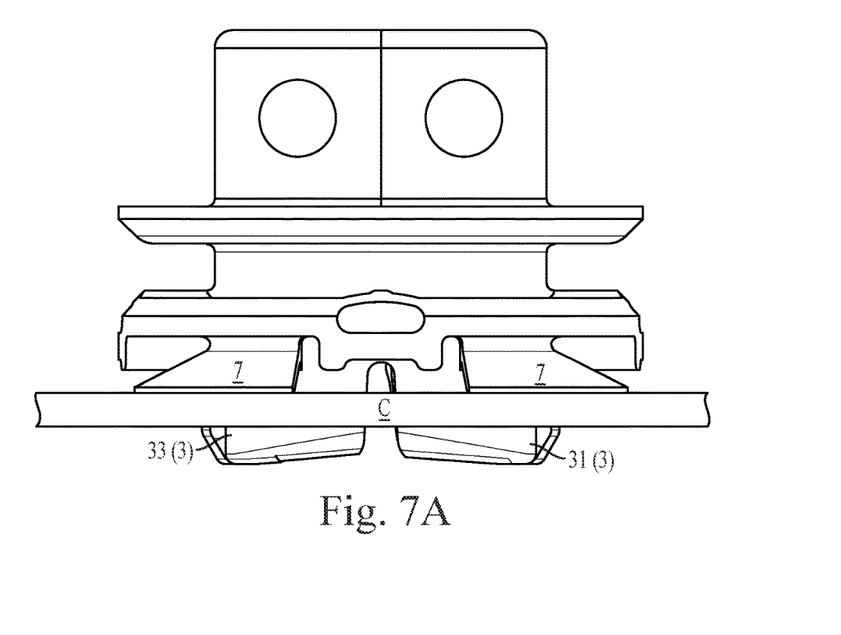
FIG. 7A illustrates the clip being installed in a standard hole of the cover body.
Figure 7B:
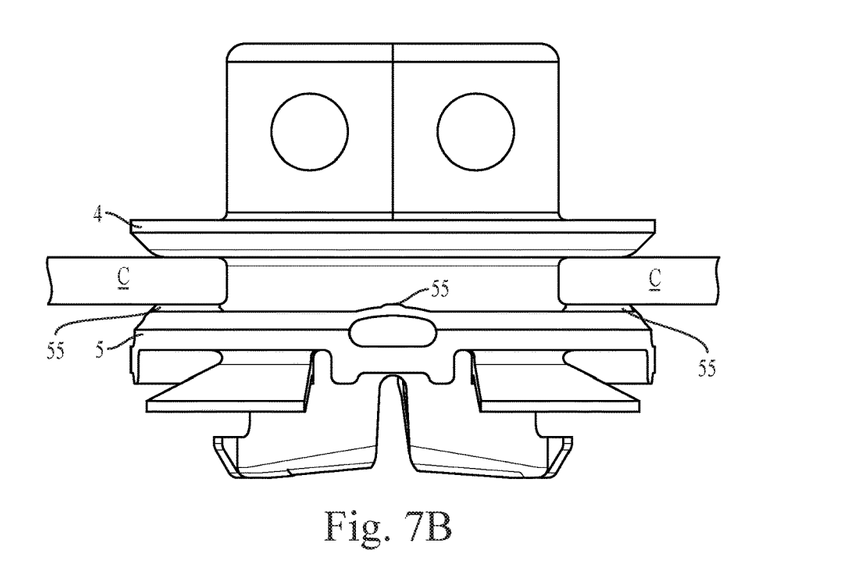
FIG. 7B illustrates the clip being installed in a non-standard hole of the cover body.

The first flange portion 4 extends radially outwardly from an outer circumferential surface of the main body portion 1 so that when the hole H of the cover body C is a non-standard hole, e.g., an elongated hole with a release hole, a hole larger than a standard hole, etc., the cover body C is sandwiched between the first flange portion 4 and the second flange portion 5 as shown in FIG. 7B. Therefore, the first flange portion 4 has a diameter greater than that of the elongated hole EH and a large hole LH of the cover body C as shown in FIGS. 6A-6B. In addition, since the first flange portion 4 is formed for engaging the non-standard hole, the diameter of the first flange portion 4 is greater than a distance between the front claw portion 31 and rear claw portion 33.

The second flange portion 5 is described in details in FIGS. 1-5B.

The second flange portion 5 extends radially outwardly from the outer circumferential surface of the main body portion 1 between the first flange portion 4 and the claw portions 3 so that when the hole H of the cover body C is the non-standard size hole, e.g., an elongated hole with a release hole, a hole larger than a standard hole, etc., the cover body C is sandwiched between the first flange portion 4 and the second flange portion 5. Therefore, the second flange portion 5 has a diameter greater than that of the hole H of the cover body C. In addition, since the second flange portion 5 is formed for engaging the non-standard hole, the diameter of the second flange portion 5 is greater than a distance between the front claw portion 31 and the rear claw portion 33.

The second flange portion 5 includes a plurality of holes (herein after "concave portions") 51, a plurality of elastic portions 53, and a plurality of leg portions 55.

Figure 1:
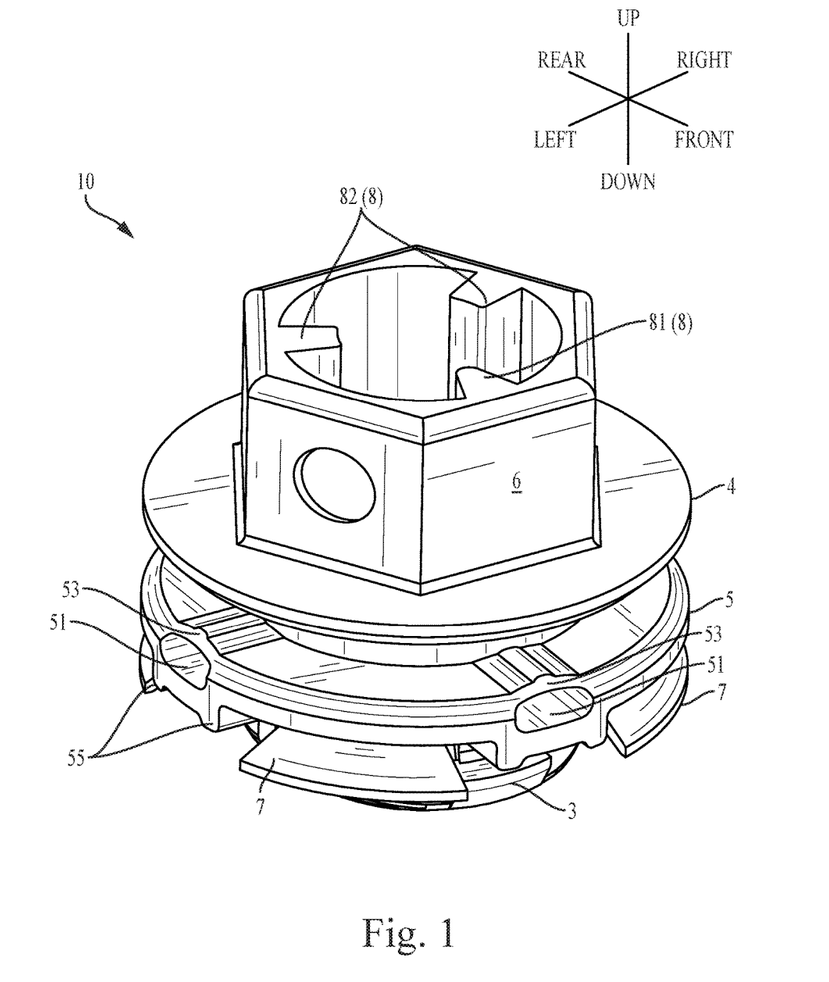
FIG. 1 is a perspective view of a clip of the present invention.

In the present embodiment, four concave portions 51 are formed in the second flange portion 5 and arranged to have equal distance away from each other in a circumferential direction of the second flange portion 5 as shown in FIG. 1. Each of the concave portions 51 extends from an outer edge of the second flange portion 5 to an outer surface of the main body portion 1 in a radial direction of the second flange portion 5 as shown in FIG. 5A. Each concave portion 51 provides a space for the elastic portions 53 to deform downwardly when the clip 10 engages the non-standard hole.

The plurality of elastic portions 53 extends above the plurality of concave portions 51. More specifically, in the present embodiment, four elastic portions 53 extend above the four concave portions 51 respectively, partially defining an upper surface of the second flange portion 5. Each of the elastic portions 53 has an arc-shape protruding upwardly toward the first flange portion 4. The elastic portion 53 has a thickness less than a portion of the second flange portion 5 so that the elastic portion 53 has an elasticity for urging the cover body C toward the first flange portion 4 when the cover body C is sandwiched between the first and second flange portions 4, 5. At the portion of the second flange portion 5 below the concave portion 51, the plurality of leg portions 55 is provided.

The plurality of leg portions 55 is formed on a lower surface of the second flange portion 5. More specifically, a pair of leg portions 55 is protruding downwardly from the lower surface of the second flange portion 5 adjacent to two edges of each of the concave portion 51 in the circumferential direction. The leg portion 55 increases the rigidity in the vicinity of the concave portion 51 so that the portion of the second flange portion 5 below the concave portion 51 does not deform along with the elastic portion 53. Further, on the lower surface of the second flange portion 5, the plurality of elastic pieces 7 is formed.

The plurality of elastic pieces 7 is described in details in FIGS. 1-5B.

The plurality of elastic pieces 7 extends radially outwardly and downwardly from the lower surface of the second flange portion 5 as shown in FIGS. 5A-5B. In the present embodiment, the clip 10 has four elastic pieces 7 and each elastic piece 7 is arranged between the concave portion 51 and the adjacent concave portion 51 in the circumferential direction. When the hole H of the cover body C is a standard size hole SH, the clip 10 is inserted through the hole SH, and the plurality of elastic pieces 7 urges the cover body C toward the plurality of claw portions 3 and sandwiches the cover body C between the plurality of claw portions 3 and the plurality of elastic pieces 7.

Figure 2:
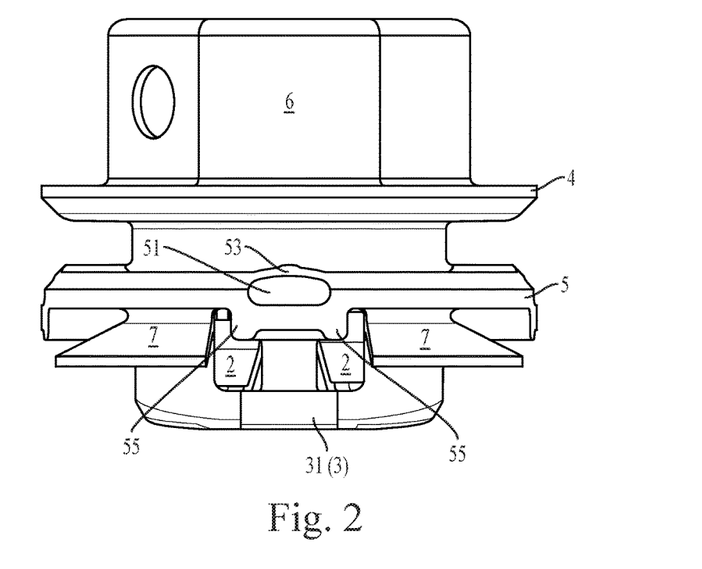
FIG. 2 is a front view thereof.

The tool hooking portion 6 is described in details in FIGS. 1-3.

The tool hooking portion 6 is formed on an upper side of the main body portion 1 above the first flange portion 4. In the present embodiment, the tool hooking portion 6 has a hexagonal shape for receiving a tool such as a wrench to rotate in respect to the screw portion protruding from the transmission control module so that the locking portions 2 are disengaged from the screw portion to disengage the clip 10 from the transmission control module.

Next, an installation of the clip 10 of the present embodiment is explained in details in FIGS. 6A-7B.

In the case for installing the clip 10 in a standard size hole SH of the cover body C as shown in FIGS. 6A-6B, the clip 10 is inserted from the lower side of the main body portion 1 having the plurality of claw portions 3. The user presses the clip 10 into the standard hole SH of the cover body C, until the claw portions 3 abut against the edge of the standard hole SH causing the lower side of the main body portion 1 to deform so that the front claw portion 31 and the rear claw portions 33 move toward each other to pass through the standard hole SH. After the plurality of claw portions 3 passes through the standard hole SH, the plurality of claw portions 3 returns to an original form to engage an edge of the standard hole H as shown in FIG. 7A. The plurality of elastic pieces 7 urges the cover body C toward the plurality of claw portions 3; thereby, the cover body C is held between the plurality of elastic pieces 7 and the plurality of claw portions 3. Thus, the installation of the clip 10 is complete.

In the case for installing the clip 10 in a non-standard hole such as an elongated hole EH or a large hole LH with a groove of the cover body C as shown in FIGS. 6A-6B, the user installs the clip 10 into the non-standard hole from an end of the groove or from the release hole such that the cover body C is sandwiched between the first flange portion 4 and the second flange portion 5 as shown in FIG. 7B. The user slides the clip 10 along the release hole of the elongated hole EH or the groove of the large hole LH to position the clip 10 at a predetermined location of the cover body C. The plurality of elastic portions 53 of the second flange portion 5 urges the cover body C toward the first flange portion 4 and prevents the cover body C from rattling and the installation of the clip 10 is complete.

After all of the clips 10 are installed onto the cover body C, the cover body C is placed over the transmission control module such that the locking portions 2 of the clips 10 are facing the screw portions of the male connectors of the transmission control module and aligned to the corresponding male connectors. The user presses each of the clips 10 onto the corresponding screw portion to engage the locking portions 2 of the clips 10 to the male connectors. Thus, the cover body C is attached to the transmission control module through the clips 10.

To detach the cover body C from the transmission control module, a tool such as a wrench is used on the tool hooking portion 6 to rotate and disengage the locking portions 2 of the clips 10 from the screw portions.

The above description simply illustrates the principle of the invention. Furthermore, a great number of modifications and alterations are possible for those skilled in the art, and the invention not being limited to the heretofore illustrated and described exact configurations and applications, all corresponding modification examples and equivalents are deemed to be within the scope of the invention defined by the attached claims and their equivalents.

For example, in the heretofore described, a description has been given of a case in which the main body portion 1 has two claw portion 3, but the invention is not limited to this, The clip 10 may have any number of claw portion 3 formed on the inner circumferential surface.

In the heretofore described, a description has been given of a case in which the second flange portion 5 includes four concave portions 51, four elastic portions 53, and four elastic pieces 7, but the invention is not limited to this. The second flange portion 5 may have any number of concave portions 51, elastic portions 53, and elastic pieces 7.

In the heretofore described, a description has been given of a case in which the elastic portions 53 are formed on the second flange portion 5, but the invention is not limited to this. The elastic portions 53 may be formed on the first flange portion 4 and urge the cover body C toward the second flange portion 5.

What is claimed is:

1. A clip for attaching an attaching member to an attached member through a male connector of the attached member, the clip comprising:
   a main body portion having a tubular shape with one side and another side opposite to the one side in an axial direction thereof;
   a locking portion on an inner circumferential surface of the main body portion for engaging the male connector;

a plurality of claw portions on the one side of the main body portion, each claw portion having elasticity to deform when inserted into a hole of the attaching member, and to return to an original form of the claw portion to engage an edge of the hole after passing through the hole;

a first flange portion extending radially outwardly from an outer circumferential surface of the main body portion;

a second flange portion extending radially outwardly from the outer circumferential surface of the main body portion between the first flange portion and the claw portion, for sandwiching the attaching member between the first and second flange portions, the second flange portion including a plurality of openings on an outer circumferential wall portion thereof and spaced equally apart from each other in a circumferential direction of the second flange portion, each opening extending radially toward the outer circumferential surface of the main body portion, and a plurality of elastic portions extending over the plurality of openings to define the plurality of openings, respectively, each elastic portion protruding toward the first flange portion and having elasticity to deform in the axial direction;

a plurality of elastic pieces extending radially outwardly from the main body portion; and a tool hooking portion on the another side of the main body portion, for receiving a tool to rotate in respect to the male connector, wherein when the first and second flange portions sandwich the attaching member, the plurality of elastic portions deforms to urge the attaching member toward the first flange portion, and when the plurality of elastic pieces and the plurality of claw portions sandwich the attaching member, the plurality of claw portions engages the edge of the hole of the attaching member.

2. The clip according to claim 1, wherein the plurality of claw portions is integral to the locking portion.

3. The clip according to claim 1, wherein the plurality of elastic pieces extends radially outwardly from the main body portion toward the outer circumferential wall portion of the second flange portion and is inclined with respect to the axial direction so that the plurality of elastic pieces extends away from the main body portion in a direction toward the one side of the main body portion, and each of the plurality of elastic pieces is arranged between the plurality of elastic portions in the circumferential direction of the second flange portion for urging the attaching member toward the plurality of claw portions.

4. A clip attaching structure comprising:

a clip according to claim 1, and the attaching member including a cover body with the hole for receiving the clip, wherein the clip is inserted into the hole to engage the cover body with the plurality of claw portions or to engage the cover body between the first and second flange portions, and the clip is adapted to attach to the male connector protruding from the attached member.

5. The clip according to claim 1, wherein each of the plurality of claw portions includes a first surface having an inclination so that a width of the claw portion in a radial direction of the main body portion increases in the axial direction toward the another side of the main body portion, and a second surface extending radially outwardly from the main body portion for engaging the edge of the hole of the attaching member, and a third surface connecting the first surface and the second surface.

6. The clip according to claim 5, wherein a space is arranged in the axial direction between the plurality of claw portions and the plurality of elastic pieces so that while the first and second flange portions sandwich the attaching member, the plurality of claw portions and the plurality of elastic pieces sandwich another attaching member.

7. The clip according to claim 6, wherein the locking portion, the plurality of claw portions, the first flange portion, the second flange portion, and the tool hooking portion are formed in one piece structure.

* * * * *